2,636,984

[illegible]

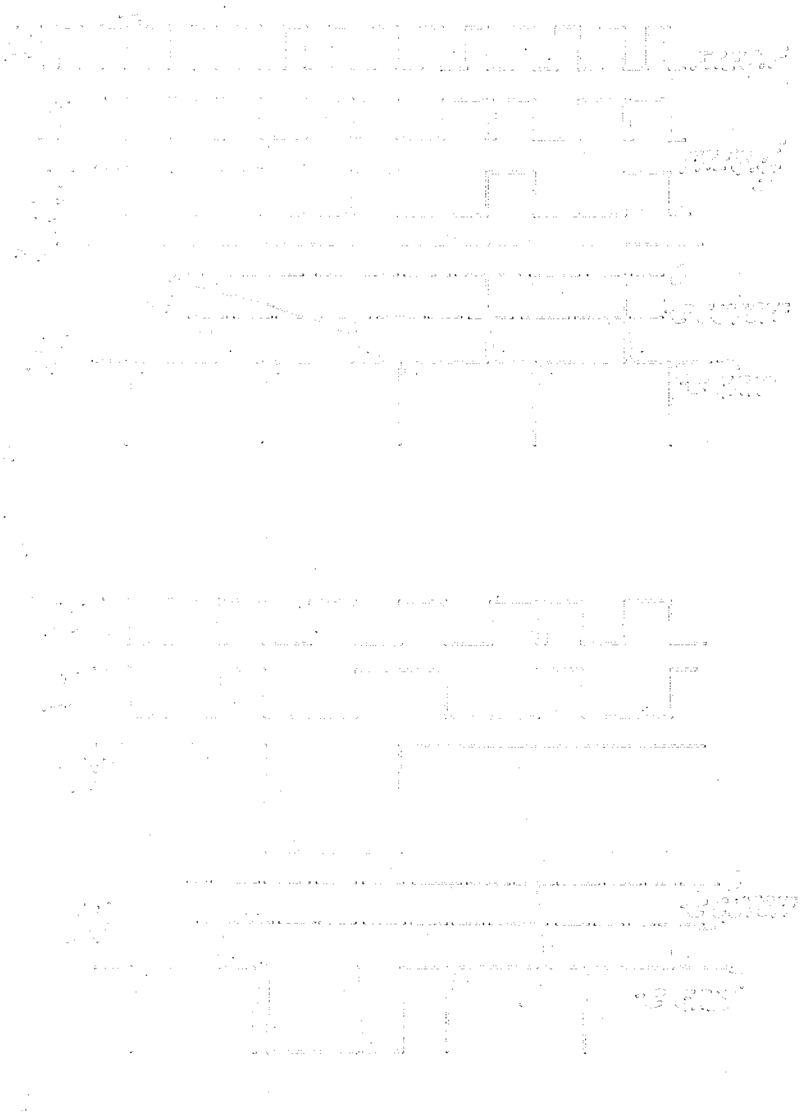

UNITED STATES PATENT OFFICE 2,636,984

ELECTRONIC PHASE SHIFTING SYSTEM

Arthur E. Canfora, Brooklyn, N. Y., assignor to Radio Corporation of America, a corporation of Delaware Application June 11, 1951, Serial No. 230,891

5 Claims. (Cl. 250—27)

The present invention relates to phase shifting systems, and, more particularly, to a novel system for retarding the phase of a square wave in controlled increments. The invention is particularly suited for use with a frequency divider of the binary or multivibrator type in which a reset or feedback pulse is applied from one stage to a preceding stage.

In a typical frequency divider of the binary or multivibrator type comprising two multivibrator counter stages, the output from one side of the following stage is suitably fed back to one side of the preceding stage to reduce the dividing factor or count. A two-stage counter or frequency divider will normally divide by four. With feedback, it will divide by three. In accordance with this invention, the feedback path includes an amplifier which can be controlled to omit a feedback pulse or pulses. A separate multivibrator of the "single shot" type controls the feedback tube in one or more predetermined ways to effect phase shift of the input wave to the frequency divider. A suggested use of the invention is to neutralize a constantly occurring unidirectional phase displacement between a local source and a signal received from a more or less remote point. This situation may be presented in the operation of facsimile and printing telegraph apparatus.

An object of the present invention is to provide novel means for controlling a frequency divider having a pulse feedback path by rendering the feedback path ineffective in a predetermined interval or intervals.

A further object is to provide novel means for altering the phase of an electrical wave formation under control of correction pulses.

Other objects and advantages of the invention will, of course, become apparent and immediately suggest themselves to those skilled in the art to which this invention is directed from a reading of the following specification in connection with the accompanying drawing in which:

Fig. 1 is a schematic showing of phase shifting apparatus embodying the present invention;

Fig. 2, sections a through e, shows a set of explanatory curves; and

Fig. 3, sections a to d, shows a corresponding set of curves illustrating one mode of operation of the invention.

Fig. 1 of the drawing shows, illustratively, apparatus embodying the invention for shifting the phase of an output square wave (Fig. 2c). The input wave 10 is fed to a frequency divider made up of two multivibrators or trigger circuits 12 and 14 in the illustrative example. The multivibrators and their connections are known in the art. Electronic apparatus employing multivibrators similar to those shown illustratively in Fig. 1 of the drawing is discussed in an article entitled "Electronic Digital Counters" by Warren H. Bliss appearing in the April 1949 issue of Electrical Engineering. Suitable multivibrator drive circuits are also shown in U. S. Patent No. 2,478,683 granted to Warren H. Bliss August 9, 1949.

The multivibrator 12 is in the form of a "flip-flop" or locking multivibrator having two tubes 16 and 17 coupled as shown. This multivibrator has two stable states. The resistor-condenser combinations 18 and 19, one in each cross-coupling circuit, control the switching time of the multivibrator. The input wave 10 is applied to a terminal 21 and after differentiation by a condenser 23 and resistor 26, is applied to the plate of the tube 16. Likewise, the input wave is differentiated by the condenser 31 and the resistor 32 for application to the plate of the tube 17. The negative-going pulses applied to these plates cause reversal of the multivibrator stage 12, which in normal operation would provide a square wave of one-half the frequency of the input wave 10. The output from the multivibrator stage 12 is taken from the plate of the tube 17 and is differentiated by a condenser 36 and a resistor 38 for application to the plate of the tube 39 of the multivibrator stage 14. Also, the output from the multivibrator stage 12 is differentiated by a condenser 41 and a resistor 42 for application to the plate of the tube 43. The output of the multivibrator stage 14 appears across terminals 46 and 47. With the arrangement thus far described, the output frequency would be the frequency of the input wave 10 divided by four. Referring to Fig. 2c, it is seen that the actual output frequency, because of the reset action to be described, is one-third of the frequency of the wave 10.

The feedback to or reset of the multivibrator stage 12 is accomplished over a connection 48 which includes a condenser 51 and a resistor 52 for differentiating the square wave output from the plate of the tube 43. A tube 54 is provided, the grid of which is maintained below cut-off by a negative bias voltage applied at the terminal 53 of the grid resistor 58. Any suitable biasing source (not shown) may be used. The grid resistor 58 is shunted by a grid condenser 59. The plate 61 of the tube 54 is connected to the plate of the tube 16 of the frequency divider stage 12.

The negative biasing voltage on the grid of the tube 54 is so chosen that the positive pulses from the differentiated transitions occurring at the plate of the tube 43 can cause the tube 54 to conduct and thereby reset the binary frequency dividing stage 12. This reset action occurring periodically causes a division of the frequency of the input wave 10 by three as shown by Figs. 2b and 2e.

Fig. 3 illustrates the elimination of one of the reset pulses 63 appearing in Fig. 2e. These reset pulses extend in the positive direction above the cut-off point of the grid of the tube 54. A "single-shot" or unbalanced multivibrator 66 comprising tubes 68 and 69 is provided. A multivibrator of this type is disclosed in Patent No. 2,428,926 granted October 14, 1947 to Warren H. Bliss. The grid resistor 72 for the grid of the tube 69 is adjustable so that the time duration of the pulse produced by this multivibrator may be controlled. The grid of the tube 68 is connected to the plate of the tube 69 through a direct-current path including a resistor 74. The cross-connection between the plate of the tube 68 and the grid of the tube 69 includes a condenser 76. Retard information, which may, illustratively, be in the form of periodic pulses or a square wave of the desired frequency is applied to the plate of the tube 68 from a terminal 78. Where correction or neutralization of a constantly occurring phase displacement between a local source and an incoming signal is required, the frequency of the wave or the periodicity of the series of pulses applied to the terminal 78 will be relatively constant. Where a square wave is applied to the terminal 78, a condenser 81 and a resistor 82 differentiate this wave before it is applied to trigger the multivibrator 66.

In the latter, the tube 69 is normally conducting and the tube 68 is non-conductive. When no retard information is being received, the potential at the plate of the tube 68 is relatively constant as shown by Fig. 3d. All of the reset pulses 63 will therefore be repeated in the plate circuit of the tube 54. The multivibrator 66, when tripped, remains triggered for a time which is equivalent to the time between two of the normal reset pulses 63. This time duration of the operation of the trigger circuit 66 is so chosen because it ensures the elimination of a single normal reset pulse 63.

When the multivibrator 66 triggers, the plate of the tube 68 undergoes a potential decrease. This condition is illustrated in Fig. 3c. The decrease in potential in the plate of the tube 69 is impressed, in part, upon the grid of the tube 54 making its grid go more negative than the cut off point so that the normal reset pulse occurring during the trigger time of the multivibrator 66 cannot cause the tube 54 to conduct and reset the first multivibrator 12. In this way, the object of retarding the output wave is accomplished. In the illustrative arrangement, the retardation is 120 electrical degrees as shown by Fig. 3b. The trigger time of the multivibrator 66 may be such as to eliminate two or more of the reset pulses for a greater retardation time.

The trigger circuit 66 as shown may be replaced by a controlled locking circuit similar to the multivibrator 12 or 14 so as to permanently change the order of division between two discrete numbers. The output frequency would vary between $f/3$ and $f/4$. This would apply for frequency shift keying, for example. The insertion of an extra reset pulse into the multivibrator 12 will effect an advance of phase of the output wave.

What is claimed is:

1. Phase shifting apparatus comprising means to provide an alternating current input signal of square wave form, a plurality of multivibrators for performing a frequency division on said signal whereby to provide an output signal from said multivibrators, a feedback link for feeding reset pulses from one of said multivibrators to another, and means responsive to a retarding signal for interrupting transmission of said reset pulses whereby to retard the phase of said output signal.

2. Phase shifting apparatus comprising means to provide an alternating current input signal of square wave form, a chain of two coupled stable multivibrators for performing a frequency division on said signal, said chain normally dividing said signal frequency by four, a feedback link for feeding reset pulses from one multivibrator to the other, whereby to provide an output signal from said multivibrators of a frequency which is one-third of the frequency of the input signal, and means responsive to a retarding signal for interrupting transmission of said reset pulses whereby to retard the phase of said output signal.

3. Phase shifting apparatus comprising means to provide an alternating current input signal of square wave form, a multivibrator having two stable conditions of operation, means to apply said input signal to said multivibrator, a second multivibrator having two stable conditions of operation, means to couple the output of said first multivibrator to said second multivibrator, a feedback connection from said second multivibrator to said first multivibrator whereby to alter the frequency division of said multivibrators, a third multivibrator of the unbalanced type, means to apply pulses to said third multivibrator in accordance with retard information, and means operating under control of said third multivibrator for disabling said feedback connection during the time of reversal of said third multivibrator whereby to retard the phase of the output signal from said second multivibrator.

4. Phase shifting apparatus comprising means to provide an alternating current input signal of square wave form, a multivibrator having two stable conditions of operation, means to apply said input signal to said multivibrator, a second multivibrator having two stable conditions of operation, means to couple the output of said first multivibrator to said second multivibrator, a feedback connection including a vacuum tube from said second multivibrator to said first multivibrator whereby to alter the frequency division of said multivibrators, a third multivibrator of the unbalanced type, means to apply pulses to said third multivibrator in accordance with retard information, and means operating under control of said third multivibrator for biasing said vacuum tube below cutoff during the time of reversal of said third multivibrator whereby to retard the phase of the output signal from said second multivibrator.

5. Phase shifting apparatus comprising means to provide an alternating current input signal of square wave form, a multivibrator having two stable conditions of operation, means to apply said input signal to said multivibrator, a second multivibrator having two stable conditions of operation, means to couple the output of said first multivibrator to said second multivibrator, a feedback connection including a vacuum tube from said second multivibrator to said first multivibrator to feed back reset pulses whereby to alter the frequency division of said multivibrators, a third multivibrator of the unbalanced type having a time of operation substantially equal to the time between two reset pulses, means to apply pulses to said third multivibrator in accordance with retard information, and means operating under control of said third multivibrator for disabling said feedback connection during the time of operation of said third multivibrator whereby to eliminate one feedback pulse and retard the output from said second multivibrator.

ARTHUR E. CANFORA.

References Cited in the file of this patent

UNITED STATES PATENTS

| Number | Name | Date |
|---|---|---|
| 2,492,736 | Custin | Dec. 27, 1949 |
| 2,549,505 | Mohr | Apr. 17, 1951 |
| 2,564,559 | Canfora | Aug. 14, 1951 |